(No Model.) 4 Sheets—Sheet 1.

R. C. SMITH.
VALVE DEVICE FOR MULTIPLE PRESSURE VALVES.

No. 581,564. Patented Apr. 27, 1897.

Witnesses
Jno. G. Hinkel
E. Everett Ellis

Inventor
Rudolph C. Smith
by Foster Freeman
Attorneys (No Model.)

R. C. SMITH.
VALVE DEVICE FOR MULTIPLE PRESSURE VALVES.

No. 581,564. Patented Apr. 27, 1897.

(No Model.) 4 Sheets—Sheet 3.
R. C. SMITH.
VALVE DEVICE FOR MULTIPLE PRESSURE VALVES.
No. 581,564. Patented Apr. 27, 1897.

(No Model.) 4 Sheets—Sheet 4.
R. C. SMITH.
VALVE DEVICE FOR MULTIPLE PRESSURE VALVES.
No. 581,564. Patented Apr. 27, 1897.
*Fig. 4.*
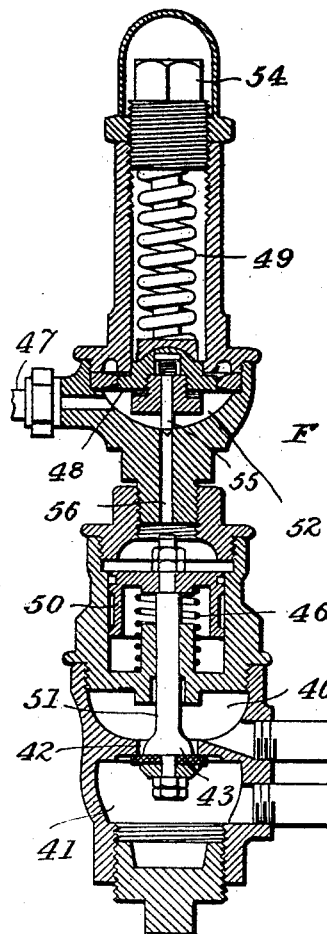
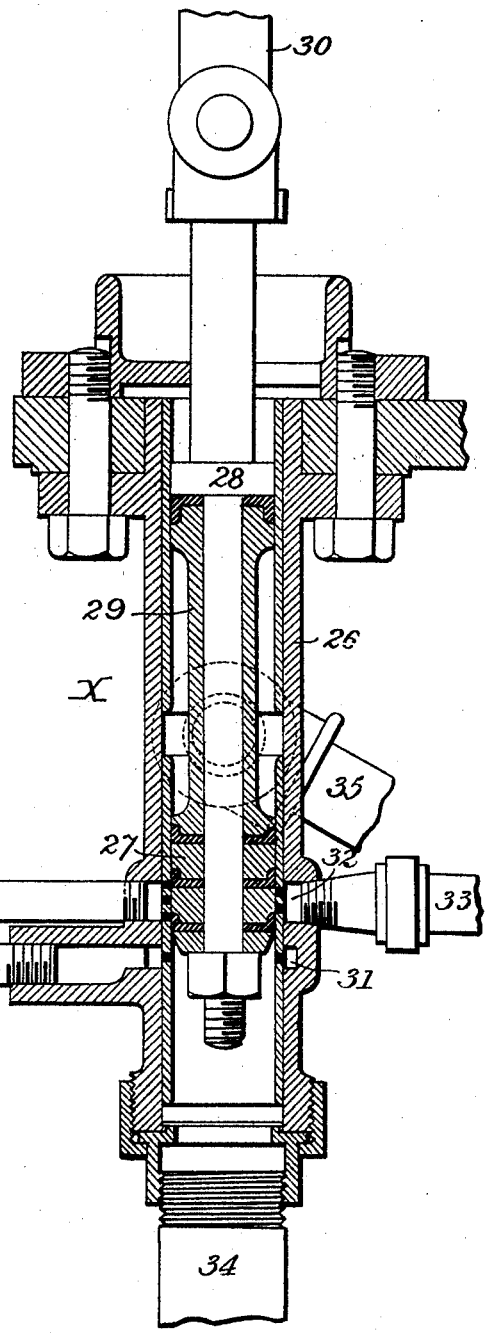
Witnesses
Inventor

UNITED STATES PATENT OFFICE.

RUDOLPH C. SMITH, OF YONKERS, NEW YORK, ASSIGNOR TO THE NATIONAL COMPANY, OF CHICAGO, ILLINOIS.

VALVE DEVICE FOR MULTIPLE-PRESSURE VALVES.

SPECIFICATION forming part of Letters Patent No. 581,564, dated April 27, 1897.

Application filed September 16, 1895. Serial No. 562,673. (No model.)

*To all whom it may concern:*

Be it known that I, RUDOLPH C. SMITH, a citizen of the United States, residing at Yonkers, in the county of Westchester and State of New York, have invented certain new and useful Improvements in Valve Devices for Multiple-Pressure Valves, of which the following is a specification.

This invention relates to an improvement in valve devices for multiple-pressure motors for elevators, cranes, presses, &c.; and it consists of a suitable power apparatus communicating with sources of fluid-supply under different pressures and means for opening communication by hand between the power apparatus and the source of supply of fluid under the lowest pressure and for automatically opening communication between the power apparatus and the source of higher-pressure fluid when abnormal pressure is exerted on the power apparatus, as fully set forth hereinafter and illustrated in the accompanying drawings, in which—

Figure 1:
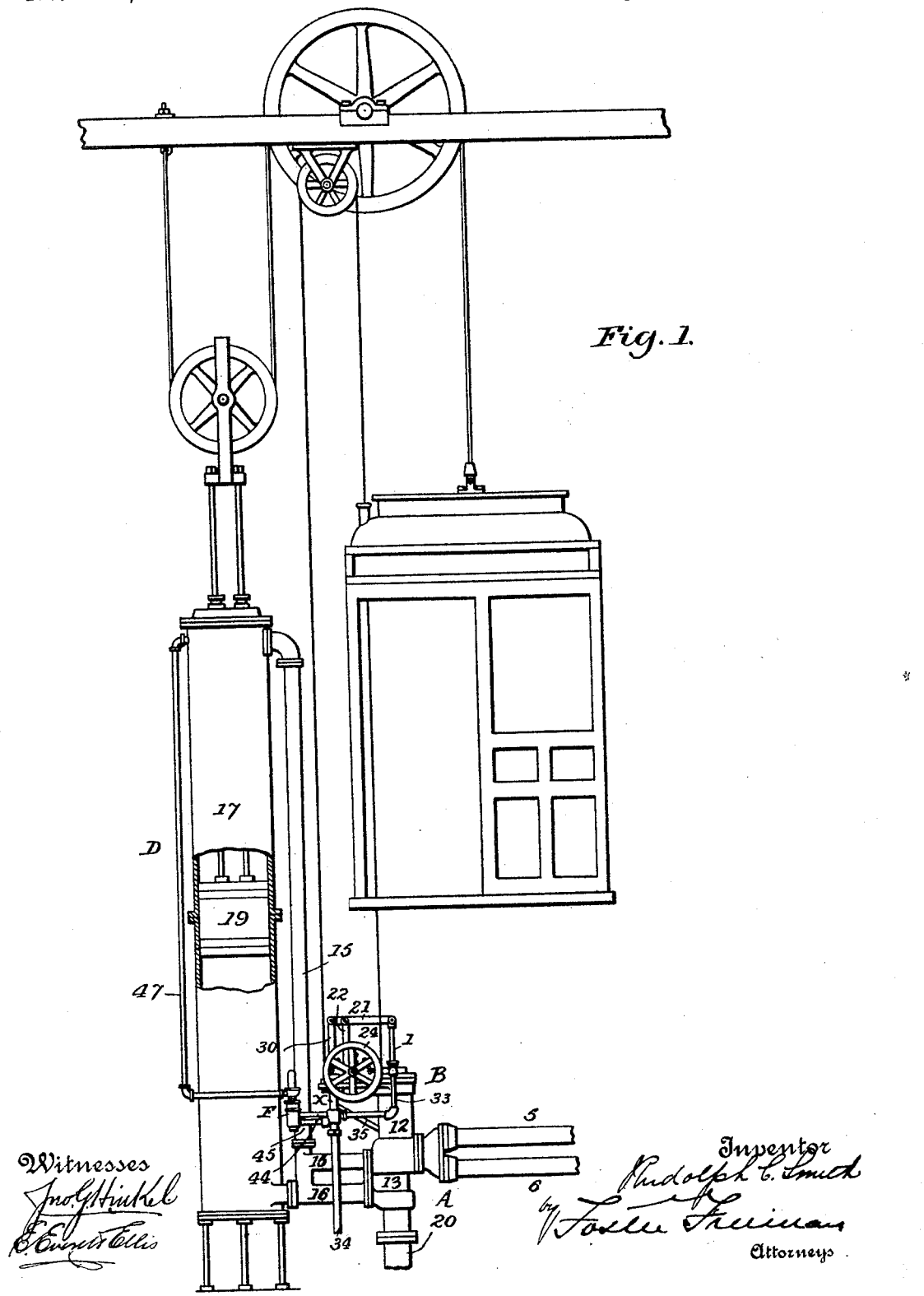
Figure 2:
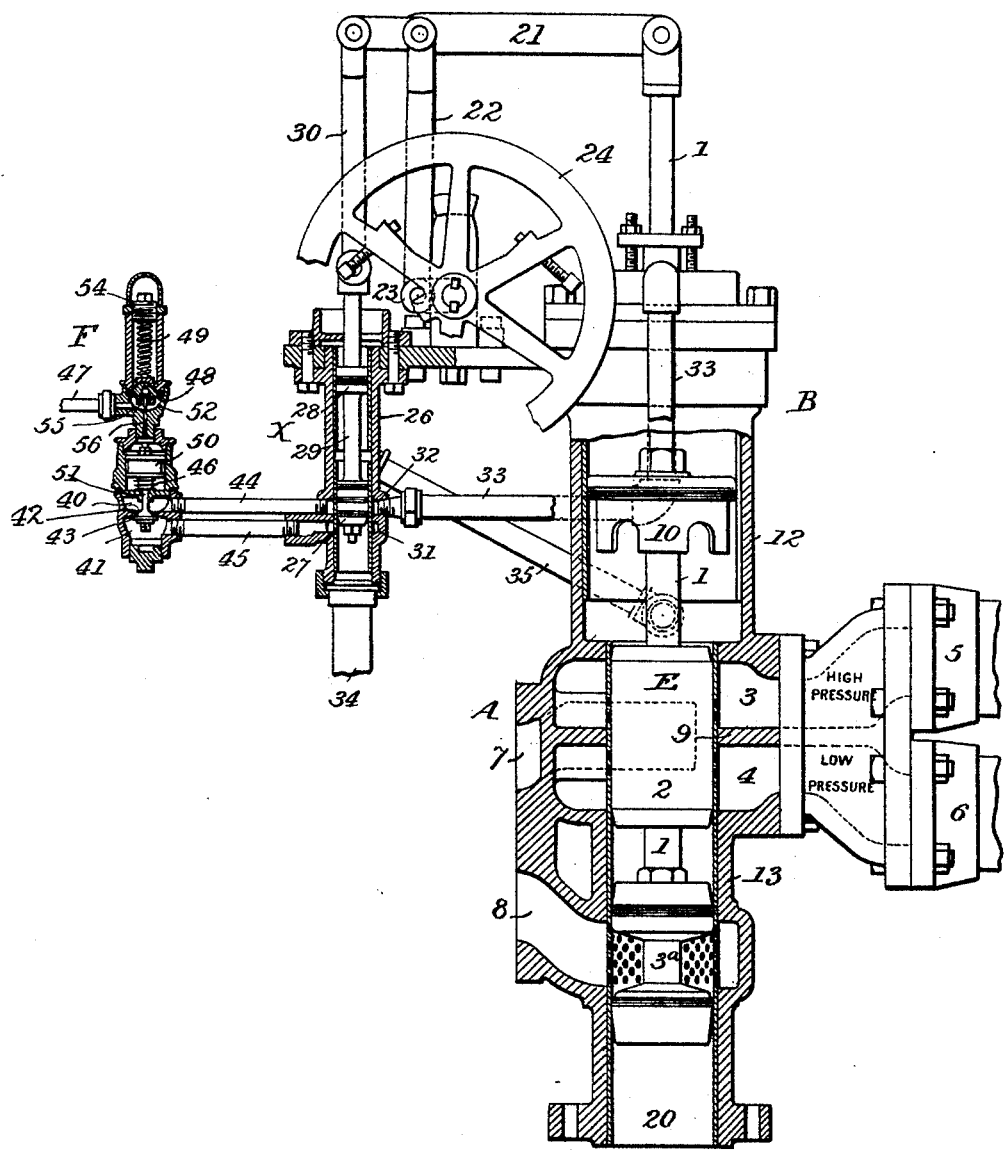
Figure 3:
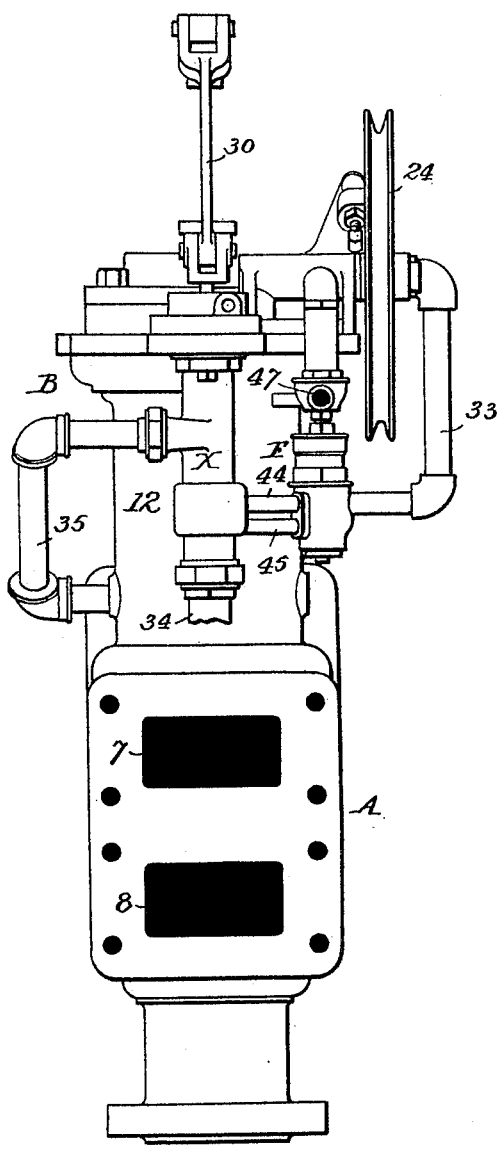

Figure 1 is an elevation showing my invention applied to an elevator and its operating mechanism. Fig. 2 is an enlarged vertical sectional elevation of part of the same. Fig. 3 is an end elevation of Fig. 2, and Fig. 4 is an enlarged detail sectional view of the pilot-valve and automatic regulating devices.

The valve device A has a casing 13 with two annular inlet ports or passages 3 4, separated by partition 9 and communicating one with a pipe 5 and the other with a pipe 6, which pipes may lead to reservoirs of different fluids or to different sources of power—as, for instance, to water at high pressure in pipe 5 and to water at low pressure in pipe 6.

The casing 13 is provided with two other discharge-ports 7 8 and with a lining for receiving a valve E, which, as shown, consists of two pistons 2 $3^a$ upon a stem 1, the piston 2 being hollow.

The ports 7 8 communicate with pipes 15 16, leading to the top and bottom of the cylder 17 of the motor device D, which may be of any suitable character—as, for instance, the engine of an elevator apparatus or the cylinder or cylinders of a press or crane or other apparatus.

When the valve is in the position shown in Fig. 2, the motor is at rest. If the valve is raised to uncover the port or passage 4, water passes therefrom to the port 7 and acts upon the piston 19 of the motor with a low pressure. If the valve is further raised to uncover the port or passage 3, water at high pressure passes therefrom to the port 4 and thence to the port 7 and the motor, the piston of which therefore operates under low pressure. If required, the pipe 6 may contain a check-valve (not shown) to prevent back pressure.

When the piston $3^a$ is above the port 8, the water discharges from the bottom of the motor-cylinder to the exhaust-port 20 of the valve-casing, and when the piston $3^a$ is thrown down below the port 8 the water can circulate either in connection with the low-pressure pipe or with both pipes from the top of the motor-cylinder through the port 7 and through the hollow valve 2 and through the port 8 to the bottom of the motor-cylinder, so that the load can descend by such circulation, the water-spaces being in communication with the pressure-pipes.

The valve of the valve device may be operated by hand or by a motor in any suitable manner. As shown, there is an operating-motor B, consisting of a cylinder 12, greater in diameter than the valve, and a piston 10 is upon the valve-stem 1 and fits said cylinder, the said stem extending upward through a packed opening in the head of the cylinder and having riveted to it a lever 21, which is connected by a link 22 to an eccentric-pin 23 and to a lever or wheel 24, from which a hand-rope or other operating means extends to the cage of the elevator if the device is used with that kind of apparatus.

With the valve device and its motor is combined a pilot-valve device X, which, as shown, has a cylinder 26, containing two pistons 27 28, upon a stem 29, which is connected by a link 30 with the other end of the lever 21.

In the casing of the pilot-valve device are two annular passages 31 32, the passage 32 communicating through a pipe 33 with the top of the cylinder 12 of the motor B, and at the end of the casing of the pilot-valve device is a discharge-port 34. A pipe 35 passes from the lower part of the cylinder 12 of the motor B to the casing of the pilot-valve device, communicating with the space between the pistons 27 28.

The valve 2, while it fits neatly the sleeve of the valve device, is not packed, so there can always be sufficient leakage of water into the lower end of the motor-cylinder B and through the pipe 35 to the space between the pistons 27 28 of the pilot-valve device. Other means for maintaining like pressure in the pilot-valve casing may be employed.

If the pilot-valve is raised to bring the piston 27 above the passage or port 32, then the pressure below the piston 10 of the motor B will lift the said piston, the water escaping from above the latter through the pipe 33, passage 32, and out at the passage 34. If the pilot-valve is thrown down so that the port 32 communicates with the port leading to the pipe 35, then there is a communication established between the ends of the motor-cylinder 12 through the pipe 35, pilot-valve casing, port 32, and pipe 33, and the pressure upon the piston 10, of larger area than the valve 2, will throw the piston and the valve 2 downward. Thus by shifting the pilot-valve the motor B may be operated to shift the main valve, and when the main valve moves it brings the pilot-valve back to the position to close the ports of the pilot-valve device, a result which is accomplished with a greater or less movement of the main valve, according as the pilot-valve has in the first instance been shifted to a greater or less extent, as in other devices of this class. The operator cannot, however, under any circumstances shift the pilot-valve by the movement of the devices under his control to a greater extent than is necessary to cause the main valve to be lifted sufficiently to open the port 4 controlling the lowest power.

In that class of engines where two powers are necessary I so construct the device that the further application of power from the higher-pressure supply is automatically applied by causing the additional load upon the main engine to shift the main valve, and I make use of an additional port or ports in the pilot-valve device whereby the pilot-valve action is preserved—that is, as the main valve is shifted to its proper extent the pilot-valve is brought to close the discharge from the motor-cylinder and the main valve is brought to rest. The parts may be differently constructed to secure this result. As shown, I make use of an automatic regulator F, which has two chambers 40 41, communicating through a port 42, closed by a valve 43, the chamber 40 communicating with the top of the motor-cylinder 12 and the chamber 41 communicating with the port 31 of the pilot-valve device.

One means of securing communication between the chamber 40 and the top of the motor-cylinder 12 is by means of a pipe 44, extending from the chamber 40 to the port or passage 32, which is in communication with the cylinder 12, and a pipe 45 extends from the chamber 41 to the port 31.

The valve 43 may be weighted, or, as shown, may be acted upon by a spring 46, which bears upon a piston 50 in the valve-casing connected to the stem 51 of the valve and tends to lift the piston and keep the valve against its seat.

Above the piston 50 is a chamber 52, across the top of which extends a diaphragm 48, upon which bears a spring 49, which may be loaded to yield different pressures by means of a compression-screw 54, and a valve 55 extends from the diaphragm into a channel 56, communicating with the chamber 52.

With the chamber 52, below the diaphragm, communicates a pipe 47, leading to the pressure side of the cylinder 17 of the main engine. Now assuming that the valve 2 of the main-valve device has been lifted to allow the low-pressure fluid to pass to the main engine, and that the pilot-valve has been shifted back to close the port 32, and that additional load is upon the main engine, so that it will not operate effectively under the low pressure, then in that case the pressure in pipe 47 and the chamber 52 of the regulator will lift the diaphragm 48, open the channel 56, and allow the fluid to press against the top of the piston 50, which will be forced downward, opening the valve 43, when the fluid will pass from the top of the motor-cylinder B, through the pipe 33, port 32, pipe 44, chambers 40 41, and pipe 45 to the port 31 and will escape at the discharge 34, and the motor-piston 10 will rise until the main valve 2 has opened the port 3, and by the time the port 3 is fully open the pilot-valve will be brought back to a position to close the port 31 and arrest the movement of the main valve. It will thus be seen that the operator has control simply of opening the communication of the apparatus with the low-pressure pipe, and that so long as the low pressure is sufficient to raise the load the operator can open and control the ports at his pleasure without bringing the high pressure into action, but that if the load should at any time be in excess then automatically the high-pressure port is opened and high-pressure motor fluid admitted to the engine, and that whether the high or the low pressure is being used the main valve controlled by a motor is under the control of a pilot-valve, which operates in the same manner in connection with both the pressures that it does in connection with a single pressure apparatus.

It will be evident that any desired multiple of pressures may be employed, as three, four, or more, in like manner by simply providing an additional number of ports arranged to be opened to permit the escape of fluid from the top of the motor-engine cylinder as the pressure in the main motor increases, these ports being arranged successively below the port 31, so as to be successively closed as the main piston arrives in position to fully open the successive ports communicating with the higher pressures.

The advantages of the several parts of my improvement will be appreciated by those skilled in the art to which it appertains, and within the scope of the invention modifications may be made in the form, construction, and arrangements of the parts and some of the features used without others, since

What I claim is—

1. The combination with the main control-valve of an elevator or other like apparatus, of a motor therefor, a pilot-valve for said motor having ports at different heights communicating with one end of the motor-cylinder, a valve for closing the communication between the motor-cylinder and the ports, and means for operating the said valve, substantially as described.

2. The combination with the main control-valve of a power apparatus, of a motor for said valve, a pilot-valve for the said motor having a number of ports at different heights all communicating with one end of the motor-cylinder, a valve for closing the communication between the motor-cylinder and the said ports, and means for automatically operating the said valve, as the load upon the engine is increased, substantially as described.

3. The combination with an elevator-cylinder and piston of a valve device having ports communicating with different sources of power, a valve E arranged to open the said ports successively and put them into communication with the said cylinder, and means whereby the valve E is raised automatically as the pressure in the main cylinder increases, and means for moving the said valve from the cage to open the first of the ports, substantially as set forth.

4. In an elevator apparatus, the cylinder and piston combined with ports communicating with two different sources of power, a valve device whereby first one port and then the other may be put into communication with the said cylinder, means for moving the said device from the cage to open one port, and automatic devices for opening the other port when the load upon the cage increases, substantially as described.

5. In an elevator apparatus, a cylinder and piston, pipes leading to two different sources of power, ports communicating with said pipes, and a motor and pilot-valve, means for moving the pilot-valve from the cage to cause the main valve to open one port, and means for operating the motor of the main valve to open the other port automatically when the load upon the cage increases, substantially as set forth.

6. The combination with the pilot-valve device controlling the motor of a main valve, and having a number of ports communicating with the pipe leading to said motor, of a valve device controlling the communication between the motor and the said ports, and means for shifting the valve of the said valve device, as the load to be lifted increases, substantially as set forth.

7. The combination of a main cylinder, its valve, motor therefor, and pilot-valve for said motor provided with a number of ports communicating with the cylinder of the motor, means for operating the pilot-valve to open one of the ports, and a regulating device provided with a valve, and communicating with the main cylinder, and means for actuating the valve of the regulating device to open the ports in proportion as the load increases, substantially as set forth.

8. The combination with a valve E, for controlling fluids under different pressures, of a valve-operating motor B and pilot-valve controlling the said motor, means for moving the pilot-valve to shift the valve E to control the low-pressure fluid, and automatic means for shifting the valve E to admit and cut off the high-pressure fluid, substantially as described.

In testimony whereof I have signed my name to this specification in the presence of two subscribing witnesses.

RUDOLPH C. SMITH.

Witnesses:
  H. R. MARSDEN,
  CHARLOTTE W. MACBRIDE.